US007076043B2

(12) United States Patent
Curbow et al.

(10) Patent No.: US 7,076,043 B2
(45) Date of Patent: Jul. 11, 2006

(54) SYSTEM AND METHOD OF USING PRESENCE INFORMATION TO DELAY DIALING PHONE CALLS INITIATED BY A CALLER TO A CALLEE

(75) Inventors: David Curbow, Sunnyvale, CA (US); Timothy Misner, Palo Alto, CA (US); Nigel Simpson, Bainbridge Island, WA (US); Vicky Oliver, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 793 days.

(21) Appl. No.: 10/137,750

(22) Filed: May 1, 2002

(65) Prior Publication Data

US 2003/0206619 A1    Nov. 6, 2003

(51) Int. Cl.
*H04M 3/42* (2006.01)
(52) U.S. Cl. .................. 379/201.06; 379/201.07; 379/201.08; 379/211.01; 379/265.05; 379/265.11
(58) Field of Classification Search .......... 379/201.06, 379/201.07, 201.08, 211.01, 265.05, 265.11
See application file for complete search history.

(56) References Cited

U.S. PATENT DOCUMENTS

| | | | | |
|---|---|---|---|---|
| 4,277,649 A * | 7/1981 | Sheinbein | ............... | 379/211.02 |
| 5,923,745 A * | 7/1999 | Hurd | ..................... | 379/265.02 |
| 6,275,575 B1 * | 8/2001 | Wu | ........................ | 379/202.01 |
| 6,704,404 B1 * | 3/2004 | Burnett | .................. | 379/209.01 |
| 2002/0085701 A1 * | 7/2002 | Parsons et al. | | |

OTHER PUBLICATIONS

Milewski, Allen E., et al.; "Providing Presence Cues to Telephone Users"; AT&T Labs Research; pp. 89-96.

* cited by examiner

Primary Examiner—Ahmad F. Matar
Assistant Examiner—Quynh H. Nguyen
(74) Attorney, Agent, or Firm—Osha Liang LLP

(57) ABSTRACT

In a communication system, a delayed call dialing processing system and method are described. The delayed call dialing processing system includes logic that allows a caller wishing to call a callee to delegate the task of monitoring presence information to detect when the callee is present to accept the call. The delayed call dialing process system further allows the caller to delegate the task of monitoring the delayed call and then makes the delegated task visible to the caller to enable the caller to either reschedule the delayed call or cancel the delayed call after the call has been queued for delay dialing. When presence information indicates that the caller and the callee are available, the calls are put through and bridged.

43 Claims, 12 Drawing Sheets

| MY BUDDIES | | | | ― ? EDIT |
|---|---|---|---|---|
| NAME 350 | LAST LOCALE 310 | DEVICE 320 | IDLE TIME 330 | SALIENT APPOINTMENT 340 |
| DAVE | ☎ OFFICE 309 | PORTAL DESKTOP | ACTIVE | NO ENTRIES. |
| NIGEL | ☎ MOBILE | PDA | (2 DAYS) | ON VACATION UNTIL 11/1 |
| VICKY | ☎ OFFICE | PORTAL DESKTOP | ACTIVE | 12:00PM-1:00PM \| LUNCH- |

-- A SIMPLE WEB-BASED BUDDY LIST

The Week Ahead

| Friday 19 | Saturday 20 | Sunday 21 | Monday 22 | Tuesday 23 | Wednesday 24 |
|---|---|---|---|---|---|
| 1:30 pm - 5:30pm Staff Meeting in SCA 16, 2746 | | | | | |
| + | + | + | + | + | + |

Tasks on Dave's Calendar
Tasks (1) 0 6 year date

Figure 8 -- Showing a Task on "Dave Curbow's calendar to call Vicky Oliver when she's available.

FIGURE 7 (CONT.)

SYSTEM AND METHOD OF USING PRESENCE INFORMATION TO DELAY DIALING PHONE CALLS INITIATED BY A CALLER TO A CALLEE

FIELD OF THE INVENTION

The present claimed invention relates generally to the field of electronic communications systems. More particularly, embodiments of the present claimed invention relate to a system of using presence information to delay dialing phone calls made to a target party until the target party is present to receive the call.

BACKGROUND ART

Communication between people is dependent upon the context in which the communication takes place. Participants in face-to-face conversations modify their behavior according to who is present, their partner's social mood and sense of urgency and many other things. Because of the importance of context in natural communications, there has been a significant amount of effort placed on understanding and adding context to technology-mediated communications.

Most of the effort has taken place in computer-supported collaboration systems and more recently in chat and instant messaging systems. In this effort, special attention has been directed at providing information about the status of others prior to initiating communication. This has included information such as whether the person is in his/her office typing on the key-board, whether the person is already busy with another conversation, or whether the person is nearby a specific device.

The rapid advances made in communication technologies have given users a plethora of choices to remain in contact with the office, home, etc. However, the pervasiveness of all these new communication devices available to, particularly, those in the office environment have not solved the problem of "phone tagging" or missed calls. The amount of time wasted in the office environment between employees trying to contact each other by phone is still quite staggering. Furthermore, the availability of mobile devices, such as cell phones, Personal digital assistants (PDA), short messaging services, etc., has not helped in alleviating the number of missed calls between employees at any given time.

Traditional telephones do not provide callers with any information about the location of a callee. Traditionally, busy signals by a telephone is indicative of one extreme form of unavailability, but generally, a telephone call has to be completed before its participants can begin communicating. Since telephone callers do not have enough information about the people that they want to call, they often make interrupting calls at unwanted times or to locations that their intended recipients have already left.

Most of today's communication devices do not provide the capability of instantaneously notifying a caller of the callee's availability on such communication mediums as the telephone or voice over IP based devices. For example, a message sent to a user's AOL instant messenger device typically presumes that the receiver of the information is available without any intelligent presence recognition capabilities to the sender of the message.

The use of presence information is well known in the art. Devices such as Webley's Media Switching Platform (MSP), chat systems, etc., use presence information to facilitate communication between two or more individual users. However, these devices only provide awareness information to a person initiating a call if the callee is either logged into the intended communication device or facility being dialed.

FIG. 1 is a block diagram illustration of a prior art presence information telephony system 100. The prior art system 100 comprises presence server 110, a network based software 120, Click dialer 130, phone network 140, desktop browser 150, calling party 160 and called party 170.

In system 100, the calling party 160 can store information about contacts (i.e., the called parties 170) that the calling party 160 may want to call. The contact information is maintained in a network based software 120 and can be accessed from any web browser 150 that connects to the presence server 110. Software 120 is an "address book" client application that stores names and phone numbers where the contacts are expected to be.

The click dialer 130 enables calls to be made from the presence information in the software 120 by simply selecting a name in the software 120. When a contact name is selected, the system 100 sends a signal to the telephone network 140 which then places two successive calls, one to the caller's phone number and the other to the callee's phone number. The two calls are then bridged together.

In the prior art system 100 shown in FIG. 1, when the calls are bridged together, the system 100 automatically dials the telephone numbers provided in the software 120 without checking to determine the presence of the party dialed. If either one of the parties called happens to be on the phone or not at the location designated by the telephone number, the caller simply either experiences a busy signal or is provided with a voice mail to leave a message.

Although the system in FIG. 1 uses presence information to contact a user, the presence information is only limited to one contact telephone number with an associated designated location. Furthermore, when the caller 160 clicks on the callee's 170 name in the software 120, the system assumes that the callee 170 is going to be present at the designated telephone number. If the callee 170 is unavailable, either because the callee 170 is busy on the phone or not at the designated number, the system is not able to automatically call the callee back with the same phone call. When the system encounters a busy signal, the caller 160 has to call back at a different time with the hope that the callee 170 will be available.

Also, in most of the prior art presence communication devices, the caller or sender of a message can send a message which may be placed in the receiving party's mail box or voice mail. It is then up to the receiving party to decide whether to read the message or return a call if required.

Other prior art presence systems have used video cameras placed in a user's office thereby allowing the user's colleagues to glimpse at what the other was doing. However, privacy concerns, as well as the need for lower bandwidth requirements made these presence information systems inappropriate.

Communication systems have advanced during the past decade from telephone to Personal Computer, soft phone applications, handheld devices, etc. Today, users of these devices want enhanced and traditional phone and email features to be integrated with new communication means. Prior art systems allow users to make calls without requiring the user to dial phone numbers. For instance, calls can be made by clicking or speaking a user's name from an address book that then automatically dials the user's phone number.

However, these prior art systems do not provide a user with the ability to delay phone calls to a party who is not available to take the call or who does not want to be disturbed at the time the call is made.

SUMMARY OF INVENTION

Accordingly, to take advantage of the myriad of communication applications being developed, a system is needed that has capabilities to allow a user ("caller") to initiate a call to another user ("callee") from within a list of callees and to have the call connection automatically delayed until both caller and callee are available to take the call. Further, a need exists for "out-of-the-box" solutions to allow a caller to delegate to a computer system the task of monitoring when a callee is available and where the computer system simultaneously notifies both the caller and the callee of the presence of the callee in order to complete a delayed call from the caller. A need further exists for an improved and less costly device independent presence information system, which improves efficiency and provides electronic call delay and notification services to various users of different device configurations without losing the embedded features designed for these devices.

What is described herein is an electronic communication system having a presence detection module for detecting when a user connects to one or more pre-identified devices associated with the user in order to automatically complete a telephone call that was initiated prior to the user connecting to the device. Embodiments of the present invention allow the caller wishing to call another person to delegate the task of watching for when the other person is available by having a computer system monitor presence information for both users. The present invention allows a user to delegate this task and then makes the delegated task visible, so that the user can either cancel or reschedule a delayed call. In one embodiment of the present invention, the communication system includes a information management system that integrates information from multiple sources such as address books, buddy lists, etc., into a consolidated catalog of user information from which the present invention may retrieve user specific information to contact the user.

Embodiments of the present invention further include a directory service for keeping a list of all locales (e.g., office, home, mobile, school, and other user defined locales) for each user. The directory service also maintains a list of identifiable devices with which each user is associated to enable the present invention to determine the set of devices through which to contact the user. In one embodiment of the present invention, the directory service includes a list of contact information defining the manner in which to contact each device associated with a particular user. These contact information may include phone numbers, IP addresses, email addresses, etc.

Embodiments of the present invention also include a presence service that keeps track of a user's activity and the locale of the user. Various user applications may update the user's activity, such as when the user logs into their desk top computer, or when they read their email. Each of these activities serve to notify the present invention of the user's presence to take a delayed call initiated prior to the user's change in activity. In one embodiment of the present invention, part of the information that is recorded by the presence service is when the user's device was last active.

Embodiments of the present invention further include a calendar service that enables the delayed dialing service of the invention to create a task for the calling user that will complete a delayed call to a callee. In one embodiment of the present invention, the calendar service tracks calendars of the caller and callee to predict when both should be available to complete a call initiated by the caller to the callee.

Embodiments of the present invention further include a delayed dialing service to process calls initiated by the caller to the callee. In one embodiment of the present invention, the delayed dialing service delays connecting a call placed by the caller if the callee is unavailable or not interested to take the call at the time the call was made. The delayed dialing service connects the call when both the caller and callee are available to take the call by using presence information about both the caller and the callee to connect and bridge calls to both parties. In one embodiment of the present invention, the delayed dialing service allows a caller to reschedule or cancel the connection of a delayed call to the callee after the call has been placed.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 is an exemplary screen display of one embodiment of the web-based buddy list of an embodiment of the present invention;

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to delay dialing calls made from a caller to a callee who is not present at the time the call is initiated to take the call. In accordance with an aspect of the invention, a delayed dialing system provides users calling capabilities that allow users the ability to use presence information to initiate calls to targeted users.

Figure 1:
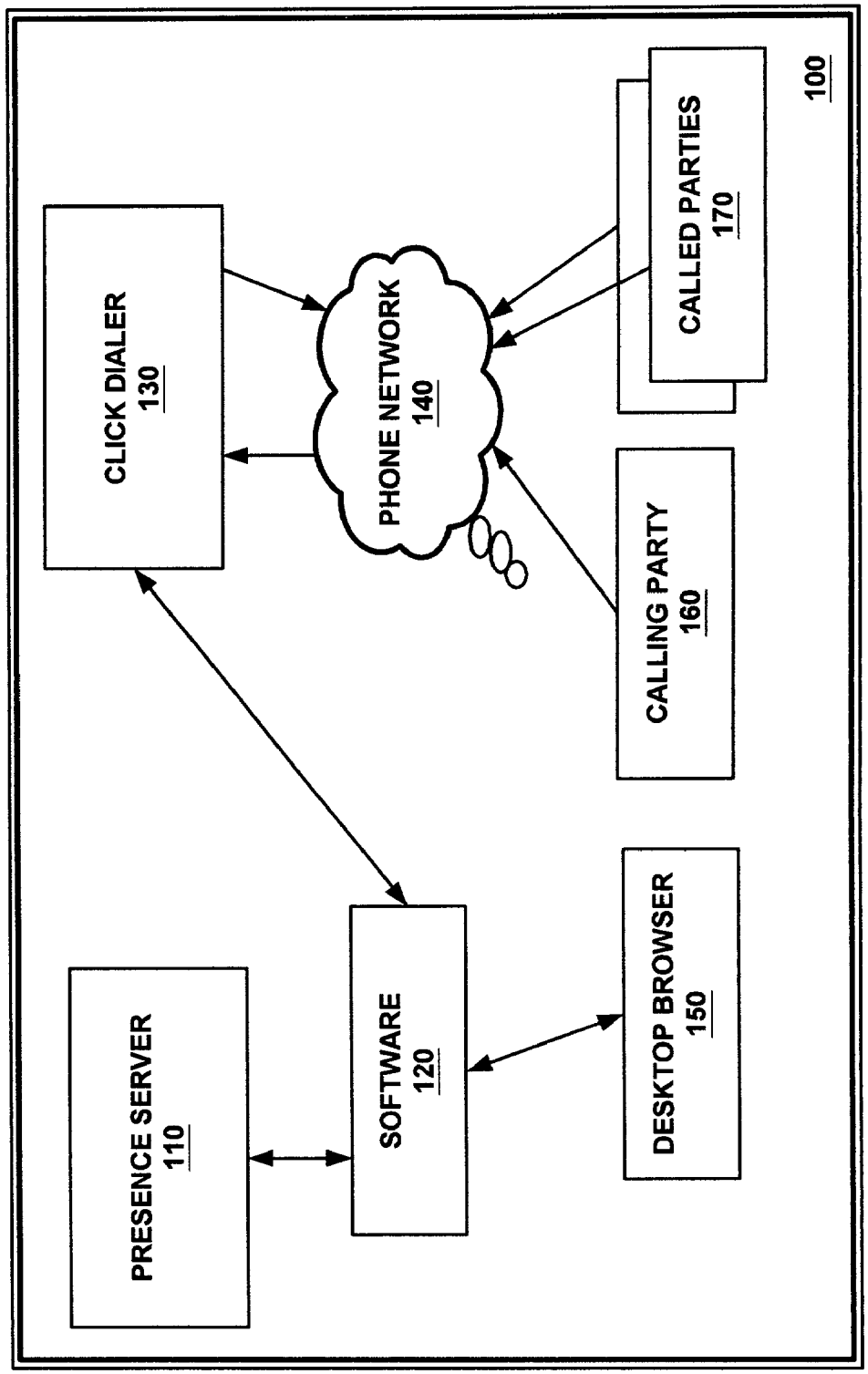
FIG. 1 is a block diagram of a prior presence information calling system.
Figure 2A:
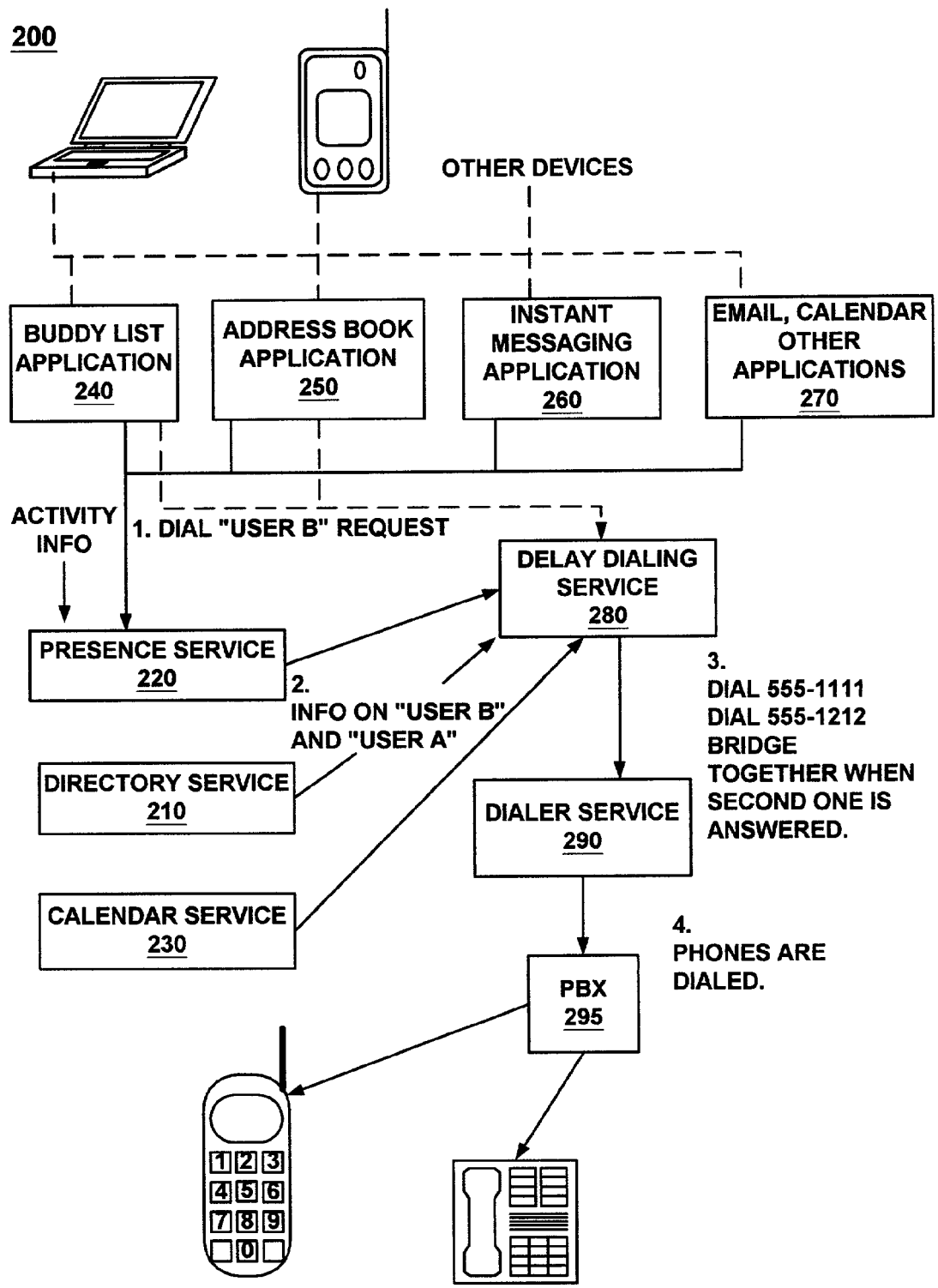
FIG. 2A is a block diagram of a call delay system in accordance with an embodiment of the present invention.

FIG. 2A is a block diagram illustration of one embodiment of the delayed dialing system 200 of the present invention. As shown in FIG. 2A, the delayed dialing system of the present invention comprises directory service 210, presence service 220, calendar service 230, buddy list 240, address book 250, instant messenger 260, email 270, delayed dialer 280, dialer service 290 and public broadcast switch (PBX) 295.

The directory service 210 maintains a list of all the locales (e.g., office, home mobile, customer office, school, other user defined locales, etc.) for each user using the dialer system 200. In one embodiment of the present invention, each locale has an associated set of devices through which the user may be contacted. These devices include PCs, phones, PDAs, pagers, etc. The directory service 210 may utilize any appropriate storage and retrieval system including, but not limited to, a Lightweight Directory Access Protocol (LDAP) server, relational databases, flat files, etc.

The directory service 210 also maintains information on how to contact each device associated with each locale. For example, using an IP address, email address, telephone number, etc.

The presence service 220 couples to the directory service 210 to keep track of a user's activity and the user's current locale. Various user applications may update the user's activity, such as when the user logs in to their desktop, or when the user reads their email, or looks up the address of another user from their address book, etc. In one embodiment of the present invention, the presence service 220 maintains information regarding the user's last active locale. This allows the delayed dialing system 200 and other users to make an inference of where the user may be. For example, a user who has not been active in his/her office for a couple of hours and the time is after 6 p.m. may be presumed not to be in the office. The delayed dialing system 200 may also query the callee's calendar for the callee's work hours and determine if the current time is before/after the callee's work hours.

Calendar service 230 couples to the presence service 220 to keep track of the user's calendar activities such as meetings, tasks (aka todo list) etc. This information is used by the delayed dialing environment 200 to determine when both users (e.g., caller and callee) will be available for a phone conversation. In one embodiment of the present invention, the calendar service 230 is used to record any delayed calls as tasks in the user's calendar. This enables the user to modify the time after which the delayed call will be made, e.g., after their 3 pm meeting.

In one embodiment of the present invention, the calendar service 230 is used to predict when a callee might be available to take a call. In another embodiment of the present invention, a caller might schedule a call on a caller's calendar after checking both the caller's and callee's calendar for when the next available time that the caller and callee may be available to take a call. In yet another embodiment of the present invention, the delayed dialing system 200 polls the presence service 220 for presence information for the caller and callee, and places the call when both the caller and the callee are shown to be available. The delayed dialing system 200 may also create a task in the caller's calendar and periodically check to determine whether that the task exists, or whether the task is due now and polls the awareness/presence service 220 to determine when users are available to take calls.

The buddy list 240 maintains a list of user specified and preferred names of a selected group of dose friends or associates that the user tracks. Unlike the address list 250, which contains a more generic and extensive list of contacts of the user, the buddy list 240 contains more detailed information about the users. The buddy list 240 may contain information such as a user's device, appointments, activities, locales, etc.

The instant messenger 260 and the email service 270 are coupled to the delayed dialer service 280 to provide the same services as in the prior art.

Still referring to FIG. 2A, the delayed dialer 280 of the present invention is called by the address book 250, buddy list 240, etc., to process a call made by a caller to a callee who may not be presently available. In one embodiment of the present invention, the delayed dialer 280 delays connecting a phone call from a caller to a callee until both parties are available to complete the call. The delayed dialer 280 automatically connects a delayed call using the presence information of a callee without having any inputs or interruption by the caller after the call has been initiated. The delayed dialer 280 uses information from the presence service 220 to determine if the users are available and then uses information from the directory service 210 and the calendar service 230 to determine how to contact them and schedule a call respectively. This applies both to the caller and the callee.

Dialer service 290 is coupled to the delayed dialer 280 to handle the telephone lines available from the PBX 295. The dialer service 290 makes the calls based on presence information and bridges two (or more) calls together as may be required.

Referring further to FIG. 2A, the user accesses a buddy list 240 or address book 250 and can examine the status of other users. The presence information is stored in the presence service 220 and queried by the buddy list 240, address book 250, etc.

These applications also update the status for the current user, for example, recording that "User A" (caller) is now "active". It also records the device being used e.g., a PDA. When "User A" uses the buddy list 240 or other applications to phone "User B", the application sends a request to dial User B to the delayed dialer 280. The delayed dialer 280 then queries the present information service 220 for information on User B to determine is he/she is available now.

Once both users are available, the delayed dialer 280 initiates the dialing process. This may be done via an optional voice portal (FIG. 2B) or by contacting the dialer service 290 directly. The delayed dialer 280 requests the telephone numbers from users A and B to be dialed and the dialing service 290 bridges the two lines together with the PBX 295 supplying the lines needed to complete the call.

Once the phone connection is made, the delayed dialer 280 updates the entries in the presence service 220 for each user thereby indicating that they are on the phone talking to each other. This information may be shown to other users if they have permission to access it. When the call is completed, the delayed dialer 280 again updates the entries in the presence service 220 for each user, but now indicating they are no longer on the phone. In one embodiment of the present invention, the delayed dialer 280 uses voice over an Internet Protocol (VOIP) to connect two callers. In another embodiment of the present invention, the delayed dialer 280 connects two callers connected to an enterprise network with voice and audio enabled personal computers or the like.

Figure 2B:
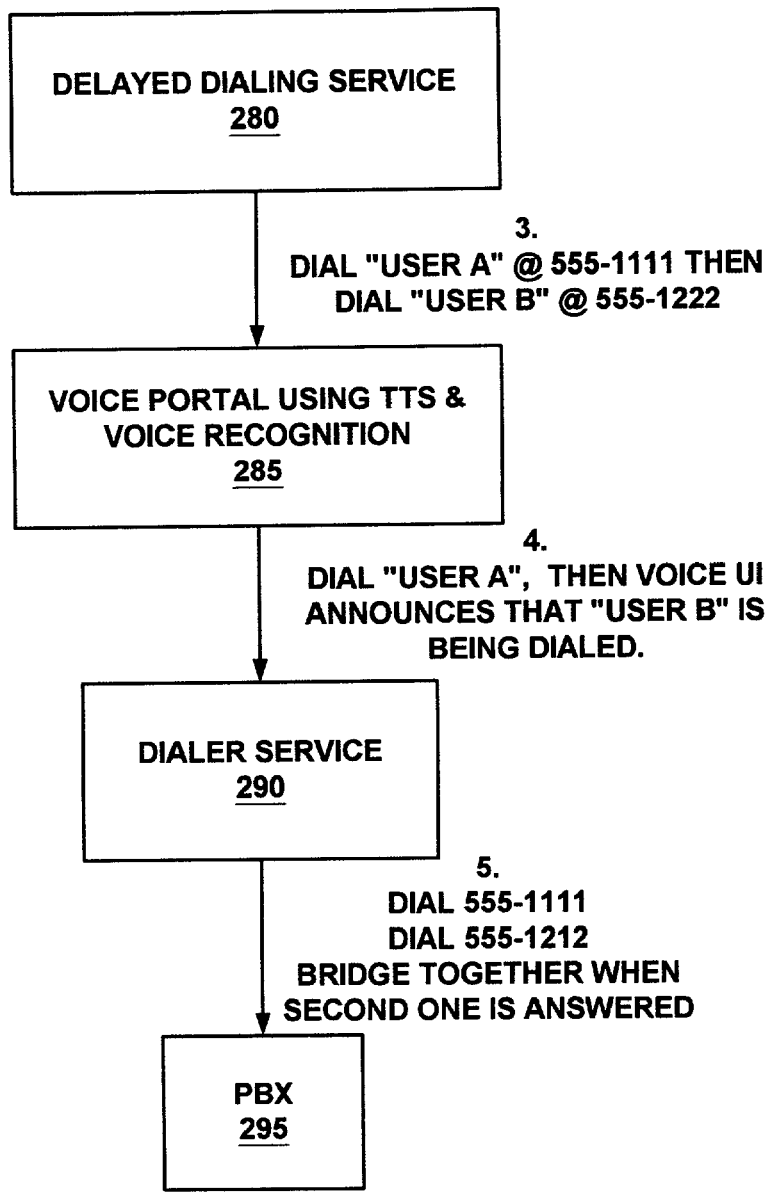
FIG. 2B is a block diagram of another embodiment of the call delay system of the present invention.

FIG. 2B is a block diagram illustration of one embodiment of the delayed dialing environment 200 of the present invention using a speech based interface. In the environment shown in FIG. 2B, a voice portal service 285 is coupled between the delayed dialer 280 and the dialing service 290 to provide speech based user interface to both users. The voice portal service 285 gives both users status information and prompting as required. In one embodiment of the present invention, the delayed dialer 280 contacts the voice portal service 285 and instructs the voice portal service 285 to dial the caller ("user A") at the appropriate phone number and announce to both users A and B that callee ("user B") is being dialed.

When the callee answers the phone, the phone calls are bridged together. However, if the callee does not respond, the voice portal service 285 presents the caller with additional options, such as leaving a voice mail, etc.

In another embodiment of the present invention, the caller can initiate a call to multiple callees for a conference call. In this embodiment, the caller selects multiple callees and calls them. The delayed dialing system 200 will then dial the selected callees for the conference call. As the delayed dialing system 200 contacts the selected callee, the delayed dialing system 200 may find that some of the selected calless are unavailable to take the call. In this case, the system 200 would present a dialog to the caller explaining who is available to take the call and who is not.

Reference is now made to FIG. 3 which is an exemplary screen display of one embodiment of a buddy list 240 of the present invention. As shown in FIG. 3, the buddy list 240 maintains names of users 350, user's last locale information 310, users device 320, etc., for each user, whether the user is active or idle 330. The buddy list 240 provides presence information to the user. In the example shown in FIG. 3, the user can tell whether another user ("buddy") is available for a phone call or not, whether they are in the office or elsewhere, what the last device used was, whether the user is currently active, and calendar information showing the current, or next scheduled appointment of that "buddy." This gives the user an indication whether that "buddy" is currently scheduled for a meeting, or soon will be, and allows the user to estimate when the "buddy" might be available. In one embodiment of the present invention, clicking on the phone icon 300 brings up a dialog window 400 as shown in FIG. 4 which describes the current status of a call in progress.

Figure 4:
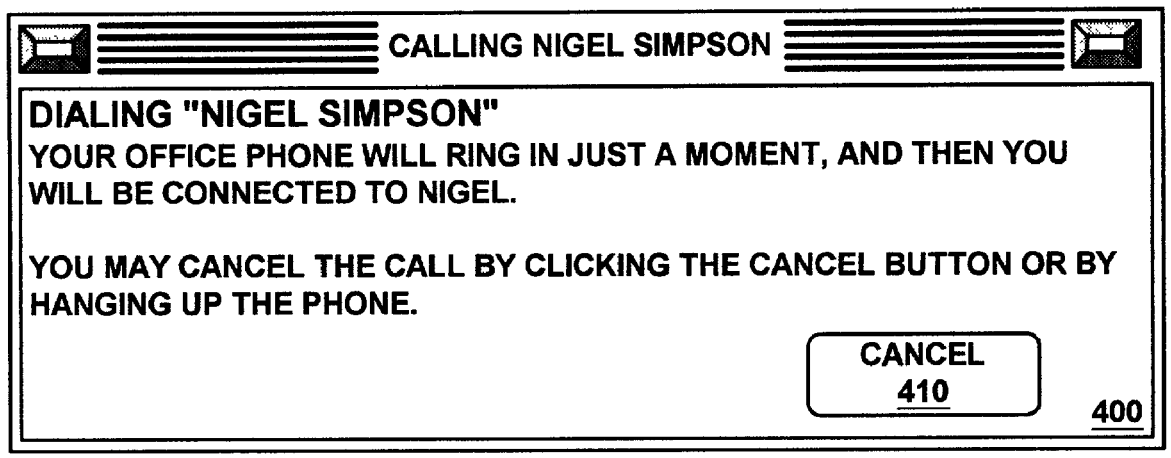
FIG. 4 is an exemplary screen display of one embodiment of a call dialing module of an embodiment of the present invention.

FIG. 4 is an exemplary screen display 400 that illustrates the status of a call initiated by a caller to a callee. As shown in FIG. 4, the current status of a call in progress is shown to the user who initiated the call. The user also has the option to cancel the call by clicking on the cancel button 410.

If a call initiated from a caller to a callee is completed, the display screen goes away. However, if the callee does not answer the call, the caller may either cancel the call by clicking on button 410 or hanging-up.

Figure 5:
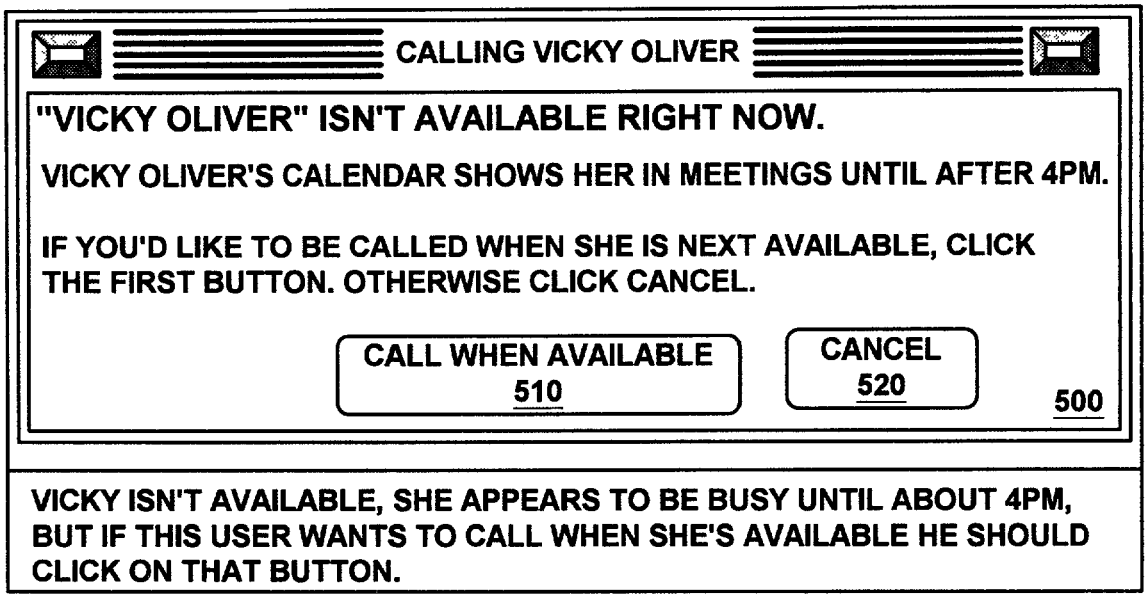
FIG. 5 is an exemplary screen display of one embodiment call-back response module of an embodiment of the present invention.

In the present invention, the caller is also given the option to reschedule the call as shown in FIG. 5. FIG. 5 is an exemplary screen display of a dialog window 500 that informs the caller that the callee is unavailable to take a call. When the callee cannot be reached via phone (they are unavailable), the caller is given the opportunity to "schedule a call to the callee when the callee next becomes available." The caller is given the option to reschedule the call with the help of the calendar information provided in the dialog window 500.

If the caller still wishes to call the callee when the callee is available, the caller dicks on the "call when available" button 510 or cancels the call by clicking on button 520.

Figure 6:
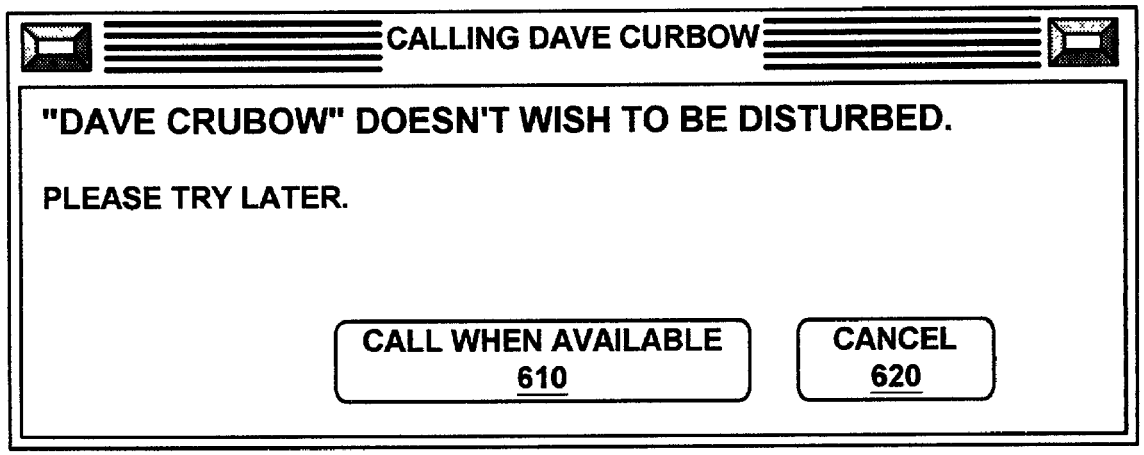
FIG. 6 is an exemplary screen display of a call message notification of one embodiment of the present invention.

Alternatively, in the case where the callee does not wish to be disturbed and has indicated that to the system 200, the caller will see a dialog window 600 as shown in FIG. 6 that will inform the caller that the callee did not wish to be bothered and to try the call later. In one embodiment of the present invention, the caller can select either one of buttons 610 and 620 in FIG. 6 to either delay the call by clicking on button 610 or cancel the call by clicking button 620. If the caller selects button 610, the delayed dialer 280 will delay connecting the call until the callee is available to take the call.

Figure 8:
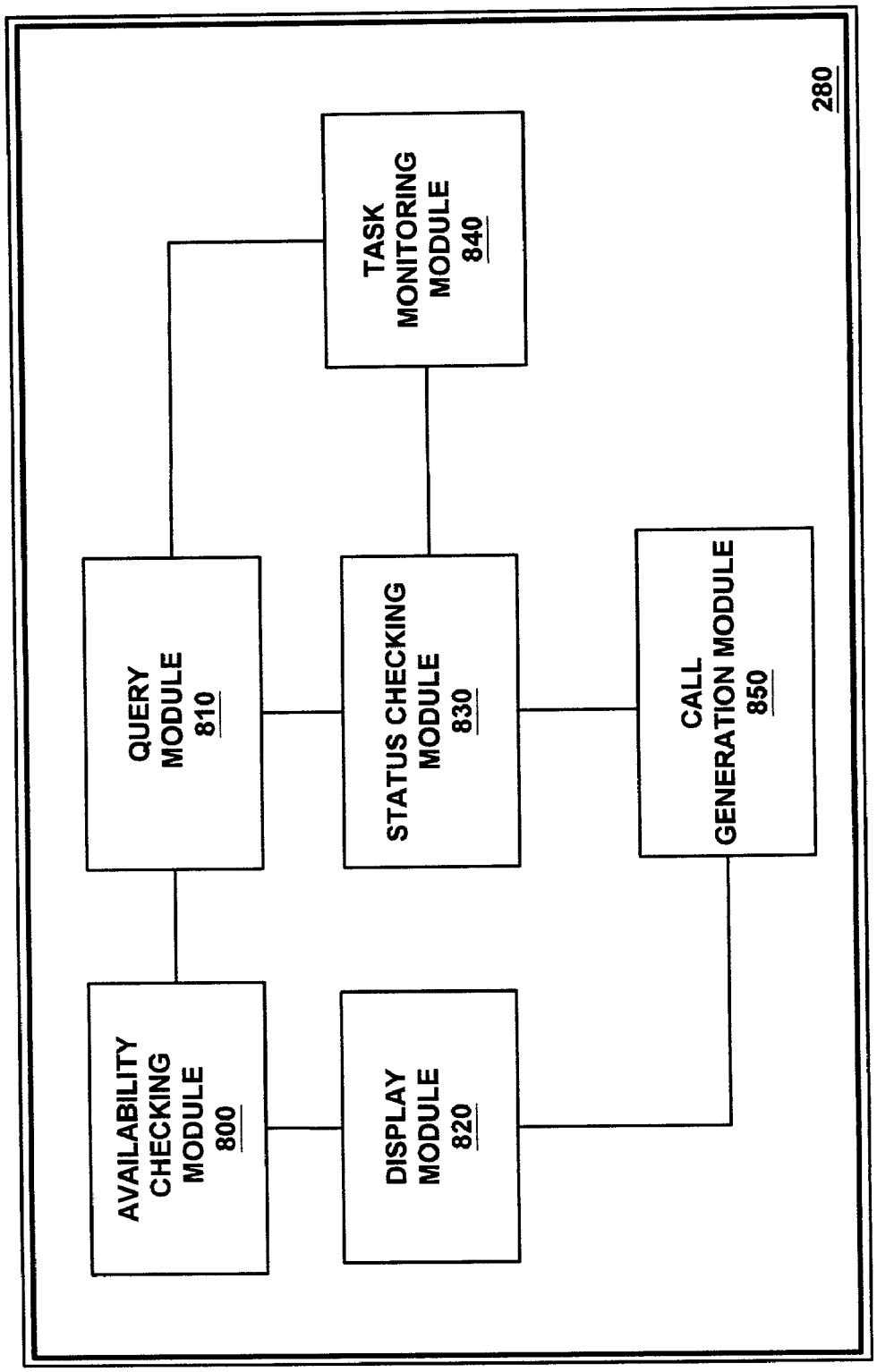
FIG. 8 is a block diagram of one embodiment of the internal architecture of the delayed dialing service of an embodiment of the present invention.

FIG. 8 is a block diagram illustration of one embodiment of the delayed dialer 280 of the present invention. As shown in FIG. 8, the delayed dialing service 280 comprises availability checking module 800, query module 810, display module 820, status checking module 830, task monitoring module 840 and call generation module 850.

The availability module 800 checks the presence service 220 to determine whether a called user is available or not. Information gathered from the presence service 220 is provided to the query module 810 by the availability checking module 800. The query module 810 is coupled to the availability module 800 to query calendars for all users having access to the delayed dialing environment 200 of the present invention. The query module 810 determines the time, via a user's calendar, when a user will be available to take a call.

Figure 7:
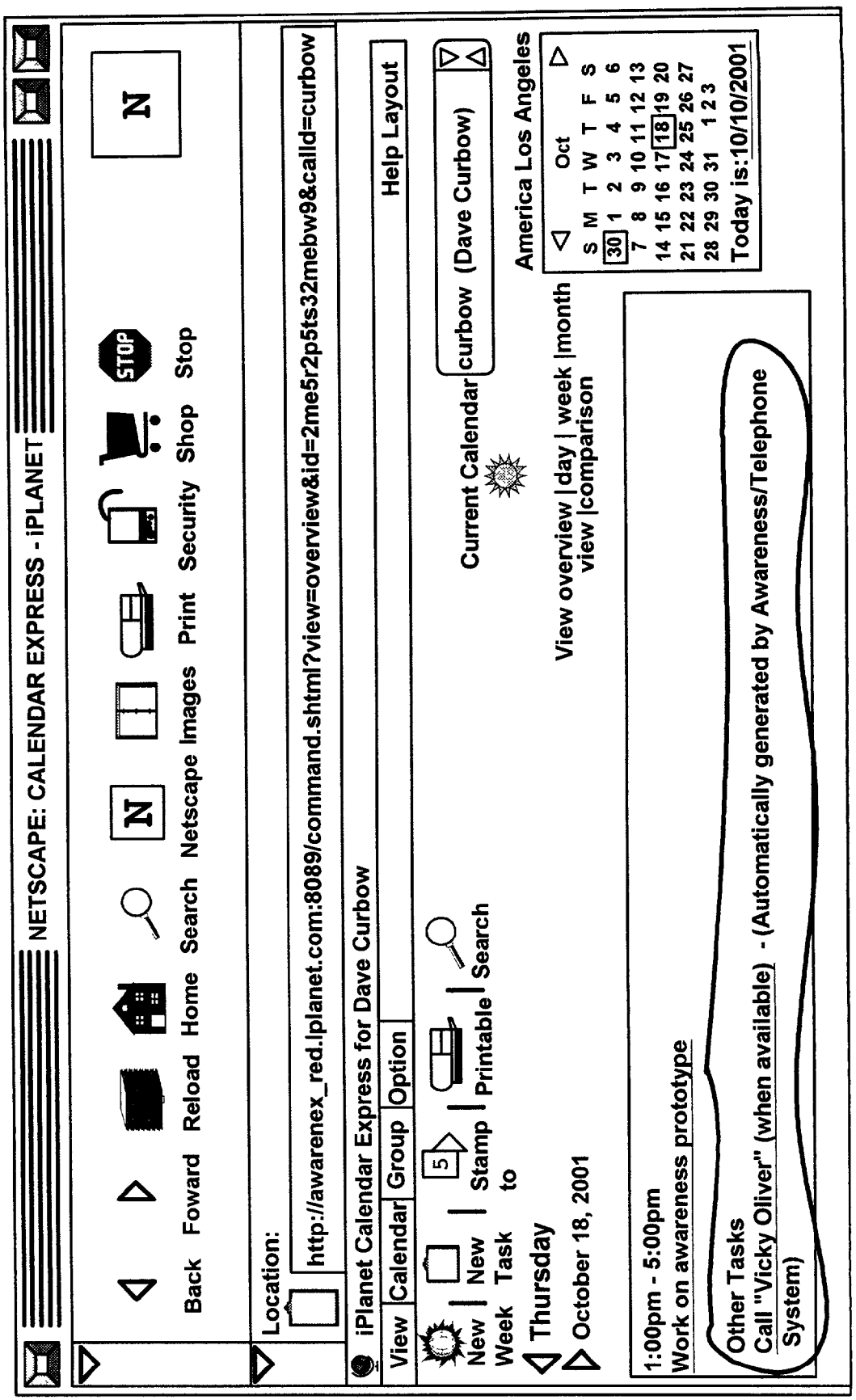
FIG. 7 is an screen display of a user's calendar showing a delayed call dialing task of an embodiment of the present invention.

The display module 820 displays to the calling user information related to a call that is delayed to a called user. The display module 820 displays in the calling user's calendar, as a task (FIG. 7), a delayed call to a called user who is not available. The entry in the calling user's calendar serves as a remainder to the user of the pending call to the callee when the callee is available.

The status checking module 830 is coupled to the query module 810 to provide a mechanism for informing the caller of the other user's availability, activeness, etc. The status checking module 830 allows the delayed dialing system 280 to automatically request a connection when the other user is available or cancel the call if the caller is unable or unwilling to wait to connect to an unavailable user.

The task monitoring module 840 is coupled to the status checking module 830 to create tasks in an unavailable caller's calendar entries (FIG. 7) to show that a call has been made that may be waiting to be connected. The task monitoring module 840 monitors tasks on the caller's calendar in conjunction with the status checking module 830. If the caller deletes a task (pending call), the process ends. The task may be rescheduled by the caller to a later time, e.g., a due time. But, once the "due time" has expired, if the task still exists, then the status checking module 830 takes over control of the task.

Once the presence service 220 indicates that both the caller and callee are available to receive a call, the caller is connected via the dialer service 290 to the callee. The call generation module 850 finds the phone numbers of the caller and the callee just prior to the call being made. This allows the caller and the callee to move between different locations and the delay dialing system 200 will call the appropriate number. The call generation module 850 queries the presence service 220 as to which location each user is, and then queries the directory service 210 for the phone number of the phone at that location.

Figure 9:
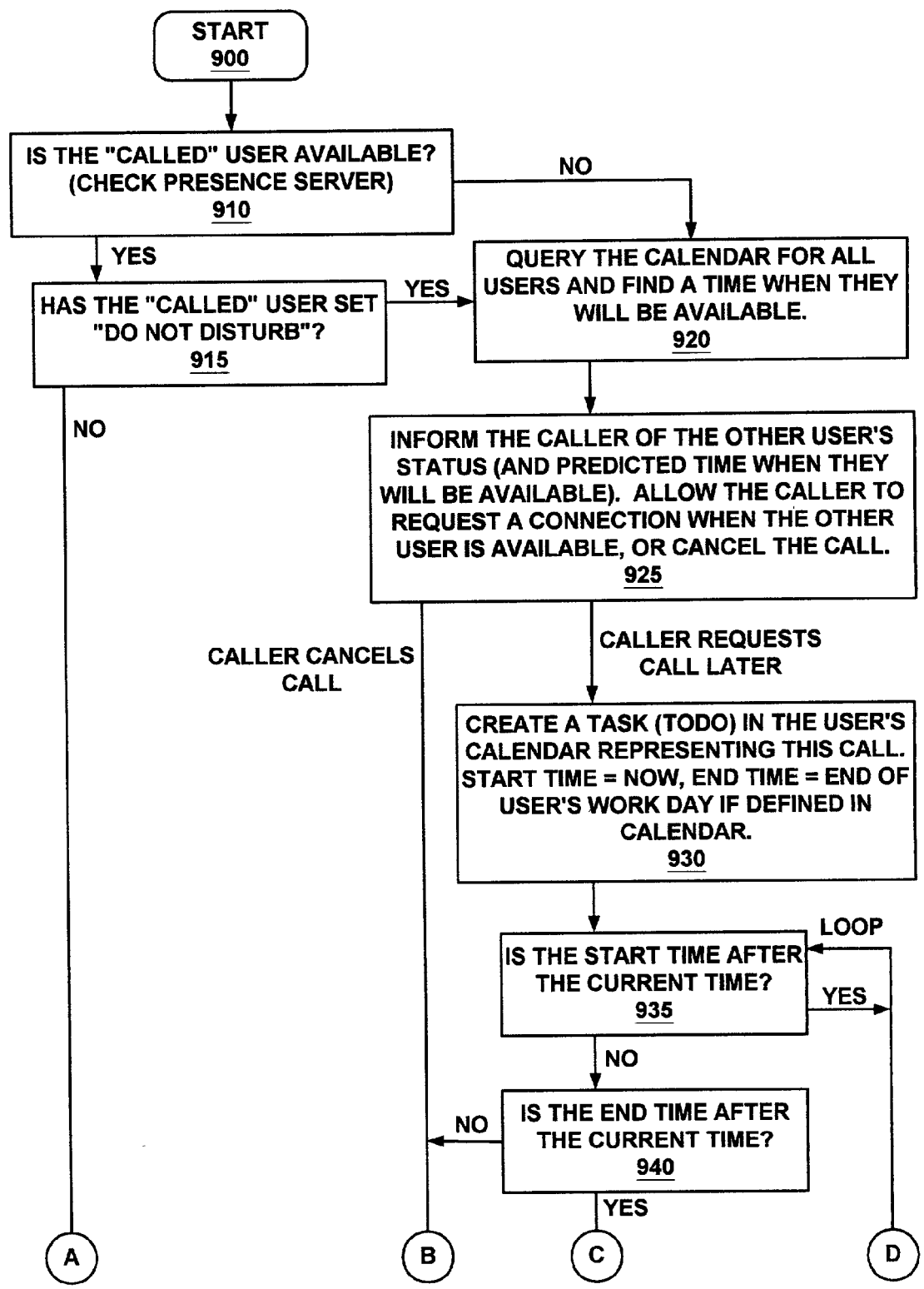
FIG. 9 is an exemplary flow diagram of one embodiment of the call delay processing of the present invention.
Figure 9:
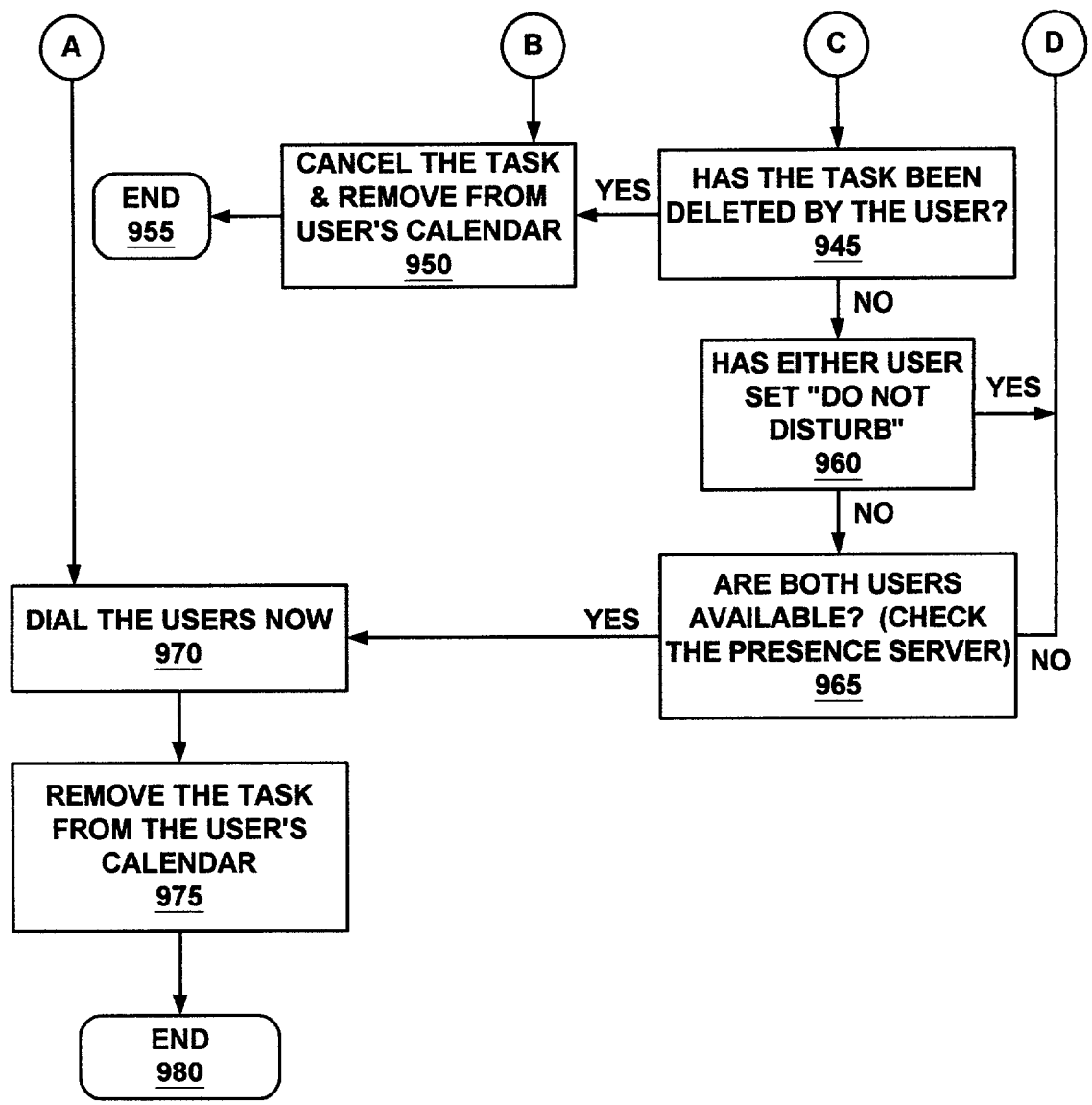

FIG. 9 is a flow diagram of one embodiment of the delayed dialing process of an embodiment of the present invention. As shown in FIG. 9, the delayed dialing process 900 is initiated when the dialer 280 checks for the availability of a called user at step 910. If the called user is available, the dialer 280 checks 915 to see if the user has set the "do not disturb" sign on. If, on the other hand, the called user is not available, the dialer 280 queries 920 the called user's calendar for all users to find a time when they will be available.

At step 925, the dialer 280 informs the caller of the other user's status and predicts a time when the called user may be available. The dialer 280 further allows the caller to request a connection when the called user is available or cancels the call.

If the caller requests a call-back later, the dialer 280 creates 930 a task (ToDo) in the called user's calendar representing the call. This may resemble a graphic icon. The caller also sets the start time of the call and an end time when the caller wants to be called back. If the caller decides to cancel the call, processing continues at step 950 where the caller cancels the call and removes the call from the called user's calendar and terminates the calling process at step 955.

At step 935, the dialer 280 checks to see if the start time set by the caller is after the current time. If the start time is after the current time, the dialer 280 loops the calling process. If, on the other hand the start time is not after the current time, the dialer 280 checks to see whether the end time is after the current time at step 940.

At step 945, if the end time is after the current time, the dialer 280 checks to see if the call task entered in the called user's calendar has been deleted by the user. If the task has been deleted, the dialer 280 cancels the task and removes it from the user's calendar at step 950.

If the task has not been deleted from the called user's calendar, then at step 960 the dialer 280 checks to see whether the called user has set the "do not disturb" sign. If the called user has not set the "do not disturb" sign, the dialer 280 checks for the availability of both users to take the call at step 965. Also at step 965, the dialer checks for the presence information of both users once it determines both users are available to take the call. This information includes checking for the current phone numbers for the caller and callee based on their current location.

If both users are not available to take the call, the dialer 280 continues with processing the call by looping back to step 935. However, if the dialer determines that both users are available, the dialer 280 initiates dialing the users at step 970. After both users have been dialed, the call task is removed from the user's calendar at step 975 and the delayed processing of end terminates at step 980.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

The invention claimed is:

1. A system for delayed dialing calls placed by a caller to a callee comprising:
   a directory service for maintaining a list of pre-determined locations where said caller and said callee may be contacted;
   a presence service for keeping track of said caller's and said callee's activities and locations to determine where said caller and said callee may be at any time;
   a calendar service for keeping track of tasks to be performed by said caller and said callee on any given day and for determining availabilities of said caller and said callee; and
   a delayed dialing service for receiving calls placed by said caller to said callee, wherein said delayed dialing service accepts said call and delays dialing said call to said callee until both said caller and said callee are available to accept said call.

2. The system of claim 1, further comprising a voice portal service for providing a speech based user interface of delayed call status information to said caller and said callee.

3. The system of claim 1, wherein said presence service comprises detection logic for automatically detecting the presence of said callee at said pre-determined locations to accept said delayed call.

4. The system of claim 3, wherein said delayed dialing service queues calls to said callee if said callee does not wish to accept said call at the time said call is initiated.

5. The system of claim 1, wherein said pre-determined locations have associated user devices with which said callee accepts said delayed call.

6. The system of claim 5, further comprising a list of names of users with associated user characteristics from which said caller selects ways to contact said callee.

7. The system of claim 5, wherein said user devices comprise a personal computer.

8. The system of claim 7, wherein said user devices further comprises a personal digital assistant.

9. The system of claim 8, wherein said user devices further include a telephone.

10. The system of claim 9, wherein said delayed dialing service uses presence information from said presence service to determine when said callee is available to accept a delayed call.

11. The system of claim 10, wherein said delayed dialing service further uses said directory service to determine how to contact said callee when said call is initiated by said caller.

12. The system of claim 11, wherein said delayed dialing service initiates dialing of said delayed call after determining that said caller and said callee are available to take the delayed call.

13. The system of claim 12, wherein said delayed dialing service connects said caller and said callee using a voice over Internet Protocol (VOIP) communication medium to handle the delayed call.

14. The system of claim 13, wherein said delayed dialing service connects said caller and said callee over an enterprise communication network with voice and audio enabled capabilities to handle said delayed call.

15. A delayed call dialing service, comprising:
- an availability module for checking availability of a caller and a callee designated to receive a delayed telephone call initiated by said caller;
- a presence module for checking said caller's and said callee's activities and locations to determine where said caller and said callee may be at any time;
- a query module for checking calendars of said caller and said callee to determine a time when said caller and said callee are both available to receive said delayed telephone call;
- a call generation module for initiating dialing of said delayed telephone call when said caller and said callee are both available and present; and
- a display module for displaying to said caller and said callee the status of a pending delayed call.

16. The delayed call dialing service of claim 15, further comprising a presence monitoring module for monitoring presence information to automatically initiate dialing of a pending delayed call to said callee.

17. The delayed call dialing service of claim 15, further comprising a presence information updating module for updating presence information for both said caller and said callee when a phone connection is established between said caller and said callee.

18. The delayed call dialing service of claim 17, wherein said presence information comprises location designations where said callee can be contacted in order to complete said pending delayed call.

19. The delayed call dialing service of claim 18, further comprising a task monitoring module for creating entries in calendars belonging to said caller and said callee to indicate the pendency of said delayed call.

20. The delayed call dialing service of claim 19, further comprising rescheduling logic for allowing said caller to reschedule the dialing of said delayed call.

21. The delayed call dialing service of claim 20, further comprising cancellation logic for allowing said caller to cancel said delayed call after said delayed call has been queued for dialing.

22. The delayed call dialing service of claim 21, wherein said monitoring presence information comprises logic for detecting the connection of said callee to a plurality of call handling devices.

23. The delayed call dialing system of claim 22, wherein said plurality of call handling devices comprise a personal computer system.

24. The delayed call dialing system of claim 23, wherein said plurality call handling devices further comprise a telephone.

25. The delayed call dialing system of claim 24, wherein said plurality of call handling devices further comprise a personal digital assistant device.

26. The delayed call dialing system of claim 25, wherein said plurality call handling devices include a mobile phone system.

27. A method of using presence information to handle telephone calls between a caller and a callee, comprising:
- detecting a presence information defining the presence of said caller and said callee to accept a phone call;
- maintaining in a directory service a list of locations where said caller and said callee can be contacted to accept said phone call;
- tracking tasks to be performed in a calendar service by said caller and said callee, wherein said tasks include accepting said phone call; and
- delaying dialing of said phone call until said caller and said callee are both available to accept said call as indicated by presence information, said directory service, and said calendar service.

28. The method of claim 27, wherein said delay dialing comprises dialing a first number representing a presence number for said caller to initiate a first phone call to said caller.

29. The method of claim 28, wherein said delay dialing further comprises dialing a second number representing a presence number for said callee to initiate a second phone call to said callee.

30. The method of claim 29, wherein said first phone call and said second call are bridged together when said second phone call is answered by said caller.

31. A method of delay dialing a call from a caller to a callee pending the presence and availability of both said caller and said callee to accept said call, said method comprising:
- placing said call by said caller;
- delay queue dialing said call pending the presence of said callee, wherein said delay queue dialing said call further comprises using calendar information for said caller and said callee to predict a time when said caller and said callee are both available to accept said call; and
- initiating dialing of said call in response to detecting the presence and availability of both said caller and said callee to accept said call.

32. The method of claim 31, wherein said delay queue dialing said call comprises checking the availability of said callee when said call is initially placed by said caller.

33. The method of claim 31, wherein said delay queue dialing of said call further comprises informing said caller of the availability status of said callee to accept said call.

34. The method of claim 33, wherein informing said caller of the availability status of said callee comprises allowing said caller to request connection of said call when said callee is available to accept said call.

35. The method of claim 33, wherein informing said caller of the availability status of said callee comprises allowing said caller to request cancellation of said call after said call has been queued for dialing if said callee is unavailable to accept said call.

36. The method of claim 33, wherein said delay queue dialing of said call further comprises making entries in said callee's calendar to inform said callee of a pending delayed call.

37. The method of claim 36, further comprising initiating dialing a delayed call when said caller and said callee are both present to accept said call.

38. The method of claim 37, further comprising polling a presence information service to determine the availability of said caller and said callee to complete said pending delayed call.

39. The method of claim 37, further comprising initiating dialing a delayed call to multiple callees for a conference call.

40. The method of claim 38, wherein said delayed dialing to multiple callees comprises detecting which ones of said multiple callees are available to participate in said conference call and informing the caller of the presence of said multiple callees.

41. The system of claim 1, wherein said directory service, said presence service, said calendar service, and said delayed dialing service access pre-existing information relating to said caller and said callee.

42. The system of claim 41, further comprising:
an information management service for integrating said pre-existing information from a plurality of sources.

43. The method of claim 27, wherein said presence information, said list of locations, and said tasks are pre-existing information relating to said caller and said callee.

* * * * *

UNITED STATES PATENT AND TRADEMARK OFFICE
CERTIFICATE OF CORRECTION

PATENT NO. : 7,076,043 B2
APPLICATION NO. : 10/137750
DATED : July 11, 2006
INVENTOR(S) : David Curbow et al.

It is certified that error appears in the above-identified patent and that said Letters Patent is hereby corrected as shown below:

Col. 12, lines 42-46, replace "The method of claim 33, wherein informing said caller of the availability status of said callee comprises allowing said caller to request connection of said call when said callee is available to accept said call." with --The method of claim 31, wherein said delay queue dialing of said call further comprises informing said caller of the availability status of said callee to accept said call --.

Signed and Sealed this

Third Day of October, 2006

JON W. DUDAS
*Director of the United States Patent and Trademark Office*